United States Patent Office 2,784,189
Patented Mar. 5, 1957

2,784,189

TRIESTER OF GERMINE

Gordon S. Myers, Ville St. Laurent, Quebec, Paul Morozovitch, Mackayville, Quebec, and Gordon A. Grant, Mount Royal, Montreal, Quebec, Canada, assignors to American Home Products Corporation, New York, N. Y., a corporation of Delaware No Drawing. Application April 27, 1954,
Serial No. 426,028

1 Claim. (Cl. 260—287)

This invention relates to a new hypotensive compound and to a method for its preparation.

It relates more particularly to a compound having the empirical formula $C_{39}H_{61}O_{13}N$ which is a triester of germine, the esterifying acids being 1 mole each of acetic acid, α-methylbutyric acid and the low melting isomer of α,β-dihydroxy-α-methylubtyric acid.

The many naturally occurring alkaloids which have been isolated from various species of Veratrum and which are currently being used for their hypotensive effect suffer from the fact that their toxic dose levels are not too far removed from their therapeutically effective hypotensive dose levels. Consequently at normally effective therapeutic levels there are often manifestations of toxic side effects, such as emesis, which in many instances prevent the use of this family of drugs at their most effective levels or at all.

It is therefore the object of our invention to prepare a compound having a potent hypotensive effect when administered orally or parenterally and causing a minimum of toxic side effects.

It is a further object of our invention to develop a simple method of preparing such a compound.

We have accomplished the above objects by the preparation of the above-described compound which has been found to be highly hypotensive and has an extremely favorable therapeutic index in relation to acute toxicity and also emetic effect.

The new compound is prepared by dissolving germitetrine in methanol or other lower alkanol, allowing it to stand for about 30 hours at room temperature, isolating the crude residue, subjecting it to a countercurrent distribution between benzene and a buffer having a pH of about 5.5 and crystallizing the material in the most hydrophilic fraction thereof from a neutral non-reactive organic solvent in which the product is somewhat soluble, such as ether, benzene, acetone, chloroform or alcohol.

The following example is presented in order to further clarify our invention but not to limit it beyond the scope indicated in the claim:

1.115 grams of germitetrine (isolated from *Veratrum album* by the method of Glen et al., Nature, 170, 932 (1952)) was dissolved in methanol and allowed to stand at room temperature for 30 hours. The crude residue (1 gram) obtained from the methanol solution by evaporation at reduced pressure was subjected to a 24-plate Craig countercurrent distribution between benzene and 2 M acetate buffer of pH 5.5. The material from tubes 0–9 was crystallized from benzene yielding white crystals. One such preparation had a Melting point: 143–149° C. and
Rotation:
    $[\alpha]_D^{28°} -2°$ (C, 1 in chloroform)
    $[\alpha]_D^{28°} -8°$ (C, 1 in pyridine)

Alkaline hydrolysis yield: germine and 1 mole each of acetic acid, α-methylbutyric acid and the low melting isomer of α,β-dihydroxy-α-methyl butyric acid.

Calculated for $C_{39}H_{61}O_{13}N$: C, 62.3%; H, 8.19%.
    Found: C, 61.9%; H, 8.37%.

The compound is relatively insoluble in water but is freely soluble in dilute acids and organic solvents such as ether, benzene, chloroform and acetone.

1.2 mcg./kg. of body weight administered intravenously to anaesthetized dogs over a period of 10 minutes produced on the average a 30% fall in blood pressure.

The acute toxicity ($LD_{50}$) intraperitoneally in albino mice was 1500 mcg./kg. of body weight.

The emetic dose ($ED_{50}$) intravenously in dogs was 6 mcg./kg. of body weight.

In similar tests with germitetrine (the starting material), the hypotensive potency was the same, the $LD_{50}$ in mice was 145 mcg./kg. of body weight and the $ED_{50}$ in dogs was 3.1 mcg./kg. of body weight.

We claim:

The hypotensive compound having the empirical formula $C_{39}H_{61}O_{13}N$ having a melting point of 143–149° C. and optical rotation of $[\alpha]_D^{28°} -2°$ (C, 1 in chloroform) and $-8°$ (C, 1 in pyridine), said compound being a triester of germine the acid compounds of said ester being derived from equimolar portions of acetic acid, α-methylbutyric acid and the low melting isomer of α,β-dihydroxy-α-methylbutyric acid.

References Cited in the file of this patent

Klohs et al.: J. Am. Chem. Soc., vol. 74, pp. 5107–13 (1952).
Fried et al.: J. Am. Chem. Soc., vol. 74, pp. 3041–46 (1952).
Glen et al.: Nature, vol. 170, page 932 (1952).
J. Am. Chem. Soc., vol. 75, pp. 1942–8 (Nash et al.).